US008825889B2

(12) United States Patent
Smith et al.

(10) Patent No.: US 8,825,889 B2
(45) Date of Patent: Sep. 2, 2014

(54) NETWORK TRAFFIC RATE LIMITING SYSTEM AND METHOD

(75) Inventors: Michael R. Smith, Rocklin, CA (US); Sean E. Humphress, Roseville, CA (US); Dante Vitale, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1135 days.

(21) Appl. No.: 12/464,021

(22) Filed: May 11, 2009

(65) Prior Publication Data

US 2010/0287303 A1  Nov. 11, 2010

(51) Int. Cl.
*G06F 15/16* (2006.01)
*H04L 12/56* (2006.01)
*H04L 29/06* (2006.01)

(52) U.S. Cl.
CPC ............ *H04L 47/10* (2013.01); *H04L 47/2475* (2013.01); *H04L 47/22* (2013.01); *H04L 47/12* (2013.01); *H04L 47/13* (2013.01); *H04L 47/20* (2013.01); *H04L 63/0227* (2013.01)
USPC .............. 709/232; 709/228; 370/229; 710/61

(58) Field of Classification Search
USPC ......... 726/32, 31, 29, 28, 27, 26, 22, 21, 8, 7, 726/5, 4, 30, 329, 3, 2; 709/213, 204, 203, 709/223, 229, 227, 218, 208; 370/390, 389, 370/330, 316, 248, 230, 701; 380/30, 270, 380/258
See application file for complete search history.

(56) References Cited

U.S. PATENT DOCUMENTS

| | | | |
|---|---|---|---|
| 7,209,991 B2 | 4/2007 | Chappell | |
| 7,516,495 B2* | 4/2009 | Shoemaker et al. | 726/29 |
| 2001/0047421 A1 | 11/2001 | Sridhar et al. | |
| 2003/0021230 A1* | 1/2003 | Kuo et al. | 370/230 |
| 2003/0105859 A1 | 6/2003 | Garnett et al. | |
| 2005/0021971 A1* | 1/2005 | Patankar et al. | 713/176 |
| 2005/0028000 A1* | 2/2005 | Bulusu et al. | 713/200 |
| 2005/0086174 A1* | 4/2005 | Eng | 705/59 |
| 2005/0102240 A1* | 5/2005 | Misra et al. | 705/59 |
| 2005/0188079 A1 | 8/2005 | Motsinger et al. | |
| 2005/0188080 A1 | 8/2005 | Motsinger et al. | |
| 2006/0059572 A1 | 3/2006 | Shoemaker et al. | |
| 2006/0072451 A1 | 4/2006 | Ross | |
| 2008/0040463 A1* | 2/2008 | Brown et al. | 709/223 |
| 2008/0109871 A1* | 5/2008 | Jacobs | 726/1 |
| 2008/0148402 A1 | 6/2008 | Bogineni et al. | |
| 2009/0064334 A1 | 3/2009 | Holcomb | |
| 2009/0150640 A1* | 6/2009 | Royer et al. | 711/173 |

OTHER PUBLICATIONS

International Search Report Mail Date May 25, 2010. Application No. PCT/US2009/044564. Filing date May 19, 2009.

* cited by examiner

*Primary Examiner* — David Lazaro
*Assistant Examiner* — Charles Murphy

(57) ABSTRACT

A system and method is provided for rate limiting network traffic flow of an untrusted application. A master module in a server environment manages network traffic flow restrictions. A slave module executes client applications in the server environment. A services module in the server environment executes a trusted application to validate the client application to the master module. A traffic restriction module on the master module sets network traffic restrictions when validation has not been received for the client application on the slave blade, and receives client application validations from the trusted application to unrestrict network traffic flow for the client application on the slave blade.

18 Claims, 3 Drawing Sheets

NETWORK TRAFFIC RATE LIMITING SYSTEM AND METHOD

BACKGROUND

Network security is often concerned with protecting information on network devices from unauthorized access and protecting information from unauthorized modification or destruction. Networks and networking devices are becoming increasing prevalent. The ability to monitor data flowing over a network and the ability to react to anomalous conditions in a sufficiently prompt manner through appropriate network-level actions can be an important consideration in the maintenance of reliable networks and network services.

Third-party developers often desire to develop applications that can be deployed on the network or system. There can be advantages to such a system. User interest in the network or system may increase where outside development involvement is permitted. A network or system developer can provide building blocks or a backbone for others to build on and the platform developer need not go through time and expense of developing many applications on their own. Networks or systems which allow outside development involvement may be referred to as "open" or having an "open architecture".

Open architecture is a type of computer-related architecture (e.g. a software architecture, hardware architecture, network architecture, etc.) that can allow outside developers to add and modify components or applications. Standard hardware is often used in an open architecture since there are usually widely available drivers for any operating system that an application may run on. This allows third-parties to spend less time configuring an operating system or application to the open architecture hardware.

Use of an open architecture system can expose the architecture to third parties and allow third parties to access and even modify the architecture as the third party evolves and develops various applications. An open architecture a system administrator may retain administrative authority over what third-party modifications are ultimately implemented in the open architecture.

In an open architecture, all or part of the architecture that a developer or integrator wants to share can be published. Open architecture systems can often allow potential users to see inside all or part of the architecture without significant constraints. The system can have vulnerabilities, which can lead to security concerns. For example, a user may be able to improperly access information or make damaging changes to the system. While many advances in open architecture systems have been made, system security has remained an important issue that has not been well addressed in prior art systems or methods.

DETAILED DESCRIPTION OF EXAMPLE EMBODIMENT(S)

Figure 1:
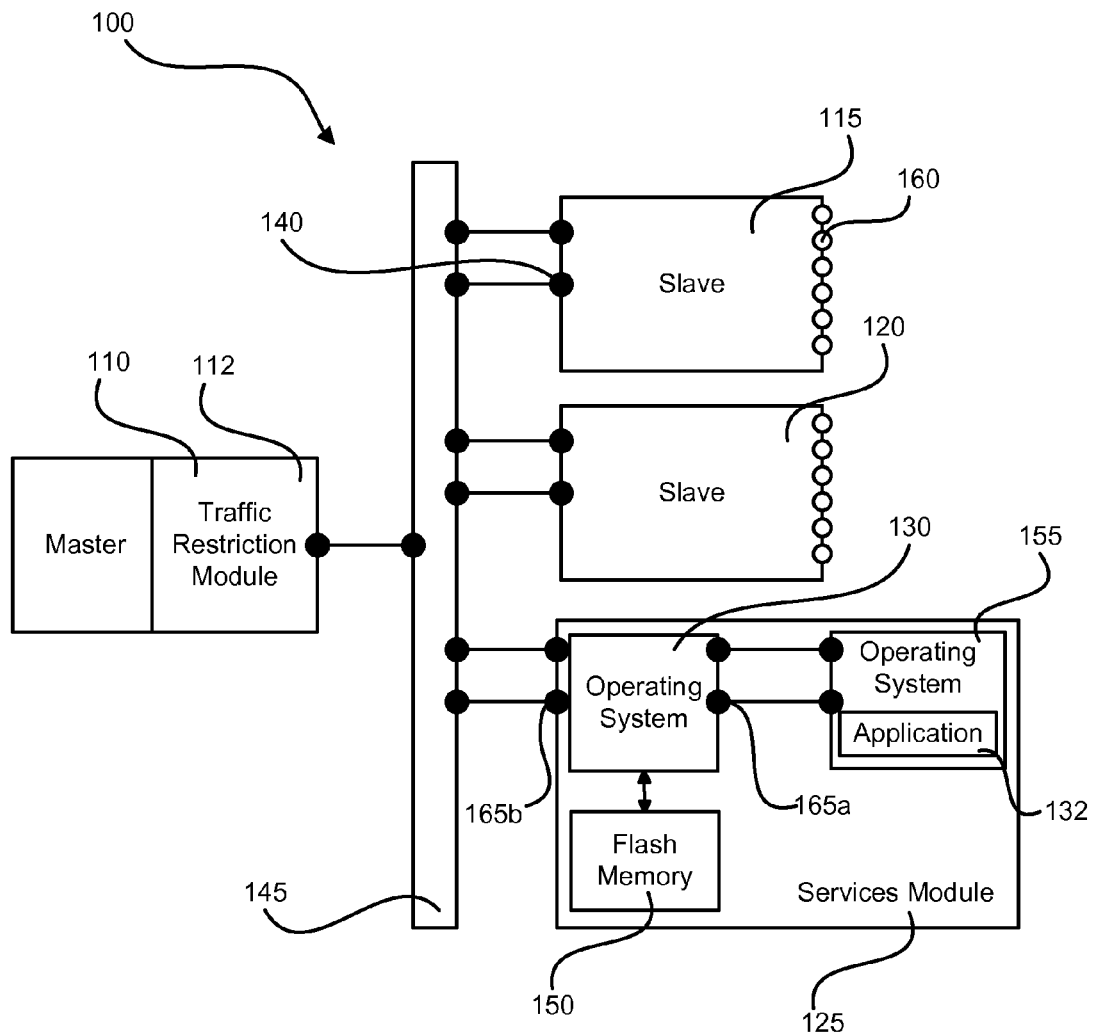
FIGS. 1-2 are block diagrams of a system for rate limiting network traffic in accordance with an embodiment.

Additional features and advantages of the invention will be apparent from the detailed description which follows, taken in conjunction with the accompanying drawings, which together illustrate, by way of example, features of the invention. Reference will now be made to the exemplary embodiments illustrated, and specific language will be used herein to describe the same. It will nevertheless be understood that no limitation of the scope of the invention is thereby intended.

Open architecture network systems can be useful and provide many advantages to users, developers, and others. However, use of an open architecture system can expose the architecture to third parties and allow third parties to access and even modify the architecture as the third party develops various applications. In an open architecture, a system administrator may retain administrative authority over what third-party modifications are ultimately allowed or implemented in the open architecture.

In an open architecture, all or part of the architecture that a developer or integrator wants to share can be published. Open architecture systems often can allow potential users to access all or part of the architecture without significant constraints. The system can have vulnerabilities, which can lead to security concerns. For example, a user may be able to improperly access information or make damaging changes to the system.

In the connected world of the Internet, destructive individuals can create major network security problems for administrators with open systems hosting many third-party programs and applications exposed to public networks, such as through an open architecture. One form of network security problem is a denial of service attack. A denial of service attack occurs when a malicious attacker sends continuous TCP/IP packets to a server. This can use system resources and cause a system to crash. Denial of service attacks and other network attacks can result in significant loss of time and money for organizations. Other types of network attacks include attempts to gain unauthorized access to a network or information on the network.

Detecting and responding to attacks can be difficult, particularly with current high-speed networks. Many systems have been developed for protecting a network from attacks from outside of a network. Firewalls are used. Routers can detect and block many forms of attacks. Various methods of user authentication for network access have been implemented. Despite the various protections for defending against external attacks to a network, attacks coming from within the network can be much more difficult to respond to and protect against.

In computer networks, rate limiting can be used to control the rate of traffic sent or received on a network interface. Traffic that is less than or equal to the specified rate can be sent, whereas traffic that exceeds the rate may be dropped or delayed. Rate limiting can be performed for policing (discarding excess packets), queuing (delaying packets in transit) or congestion control (manipulating the protocol's congestion mechanism).

A system and method is provided herein for rate limiting network traffic flow of an untrusted application. Specifically, rate-limiting may be within a network or local hardware co-location. In accordance with one embodiment, a master module in a server environment manages network traffic flow restrictions for other servers, etc. A slave module can execute client applications in the server environment. A services module in the server environment can execute a trusted application to validate the client application to the master module. A traffic restriction module on the master module can restrict network traffic on slave modules when validation has not been received and can receive client application validations from the trusted application to unrestrict network traffic flow. The system and method can provide security for a network hosting third-party applications. The system and method can provide for integration of security (in the form of rate limiting) into the system as hardware.

Figure 2:
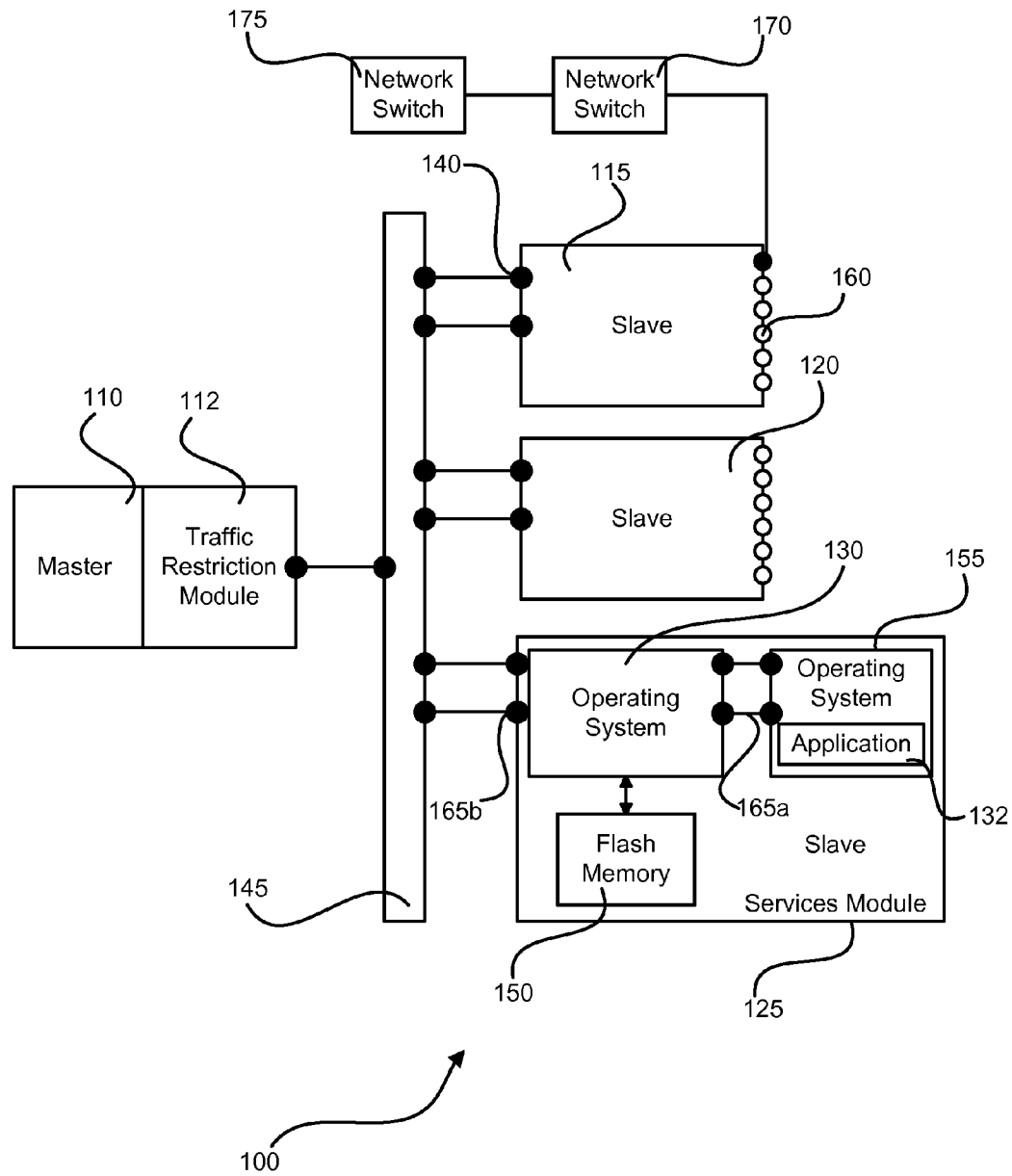

A system 100 for rate limiting network traffic flow of an untrusted application is shown in FIGS. 1-2. The system may comprise a plurality of blades in a blade server environment. The system may comprise a one or more network switches 170 and 175 connected to slave ports 160 or to the backplane 180, for connecting a Local Area Network (LAN) to the backplane 145 (and then to a services module 125 which is discussed in further detail below). The network switch may communicate with a Local Area Network (LAN) which in turn may communicate with the internet. A master blade 110 may be connected to a switch chassis or backplane. A master module or master management module may be included on the master blade. In one aspect, the master module is the master blade.

Communications can be sent to and from the master blade via network ports on the master blade and through the backplane. In one aspect, the ports are internal Ethernet connections. The master module can be configured to manage network traffic flow restrictions. For example, the master module may cause changes in hardware configurations to restrict or unrestrict network data packet traffic flow on slave modules. In another aspect, the master module may use software to manage and/or change traffic flow restrictions. Hardware and/or software on and used by the master module to manage network traffic flow restrictions may comprise a traffic restriction module.

The slave 100 may include an application specific integrated circuit (ASIC) through which the master module 110 manages and changes traffic flow restrictions. The ASIC may form at least a portion of the traffic restriction module. The ASIC may be at one or more blade ports 140 or operably connected to the ports. The master module may send a message or signal over the backplane to an ASIC on a slave blade where ports to be restricted or unrestricted are located, and the ASIC can reconfigure ports to limit traffic flow. In one aspect, the ASIC may use software to reconfigure the ports. In another aspect, the ASIC uses only hardware to reconfigure the ports. The ASIC may be a control point limiting access between internal and external network connections for a slave. Communications to the backplane may also be controlled and/or restricted by the ASIC. The system may include any number of desired ASICs. For example, a single ASIC may be used to control one or more of the ports. In another example, one ASIC may be at each port.

The plurality of blades in the server environment can include one or more slave blades. FIGS. 1-2 show two slave blades, including a first slave blade 115 and a second slave blade 120. However, the system 100 may comprise any number of desired blades. The slave blade may include slave ports 165*a-b* through which the slave blade can communicate with other internal 165*a* or external 165*b* networks or network resources. The user can connect to ports 160 on a slave blade and access other ports on the same blade or another blade.

The system 100 may include a services module 125. The services module may be on a server blade. In one aspect, the services module is a slave blade. The services module can be on a dedicated services module blade, or can be included on a master 110 or slave 120 blade. In an embodiment where the services module is included on a master or slave blade, the services module can be included in a protected and secure partition of the blade separate from where other application are executed. It can be advantageous for the services module to not be included on a slave blade so as to further remove the services module from external network access and reduce system vulnerability. Slave blades, other than the services module, may typically comprise a set of network ports, connecting the LAN to the backplane to the services module. In one aspect, the client application 132 may be executed and run on the services module in the same operating system as the trusted application.

The services module 125 can host and execute a trusted application. The trusted application may be configured to run when an operating system is running. The trusted application may start or be executed when the operating system boots up. The operating system can be a services operating system. The services operating system can be separate and different from a product operating system for executing client applications. The trusted application can be configured to validate client applications running on the product operating system. The trusted application can validate client applications to the master module 110 via a signal or message sent through the backplane 145. In response to receiving a validation of the client application from the trusted application, the master module can remove or lessen traffic flow restrictions for at least one port. Validation can be accomplished using a shared key between the trusted and client applications. The key can be unique to each client application.

The trusted application can send a hardware signal from the blade and through the backplane to the master module to let the master module know that the trusted application is running. In one aspect, the master module can impose network traffic restrictions when the trusted application is not running. The network traffic restrictions may be imposed until the master module receives a validation signal from the trusted application. The network traffic restrictions may be imposed over the entire network, over one or more blades, or over one or more ports. The trusted application may use a secure communication protocol to communicate with the master module. In one aspect, the secure communication protocol is a local area network (LAN) authentication protocol. The protocol can include a cryptographic hash. The protocol can be proprietary. The trusted application can be operable to cause the master module to enable and disable network traffic flow restrictions dynamically.

In one embodiment, the trusted application may be executed on a slave blade. Specifically, a developer may develop an application that is trusted by a system administrator and the application becomes a trusted application. In one aspect, a client application may be an untrusted application until it recognized as trusted. However, as an untrusted application initially, network traffic flows may be restricted and hamper efforts of a developer to develop the trusted application. A license, such as a Software Development Kit (SDK) license, may be used by trusted developers to have unrestricted network traffic flow. A developer can install the license. The license can tell the system that a port should always be open or that the port should not be rate limited. In one aspect, the license can tell the system that port traffic flow restrictions should be eased but not completely lifted.

When a product operating system is booted, the license can be checked against a data store and port restrictions turned off or modified. In one aspect, the data store can be a part of the trusted application. In another aspect, the data store may comprise flash memory which may be separate from the trusted application. The flash memory may be on the services module and the data store may be updated using the secure communication protocol. The flash memory may be part of a direct access module on the services module. The direct access module may be configured to allow a developer with a proper license to have direct access or unrestricted network traffic flow.

The flash memory can control flags for the license. The flags can determine network access, traffic restriction, and other variables that affect developer access to the system through the port. For example, a flag may determine how much bandwidth should be allowed through a port. In one aspect, when a developer has a license, a trusted application is not needed to signal the master module to open a port. Once the developer has prepared a client application, the license can be uninstalled or turned off to provide a proper customer environment. At this point, a trusted application can be used as described above for rate limiting network traffic flow.

In one embodiment, the services module may comprise a plurality of operating systems. The operating systems may be on separate partitions and run at the same time. A first operating system 130 may be configured to read and write to the flash memory 150. In one aspect, the first operating system may be configured for management of the second operating system or open architecture. A second operating system 155 may be included on the services module and be a platform on which developers can build client applications. The platform can be an open architecture. In another aspect, the second operating system is a subsystem to the first operating system. The first and second operating system types may be the same or different. In one aspect, at least one of the operating systems may be a Linux operating system. The first and second operating systems may be in separate partitions of the services module and can communicate via ports 165a. At least one of the operating systems may be insulated from attacks and other vulnerabilities. For example, the first operating system may be a proprietary operating system that can communicate directly with the master and slave blades. The second operating system may be a Linux operating system using a proprietary network protocol to communicate with the master but be unable to communicate directly with the master and slave blades. The second operating system may send and/or receive communications through the first operating system.

In some situations, a developer or system administrator may wish to provide an application, other resource, or information available for download by a user. For example, a user may wish to download a client application for installation, testing, use, etc. Without validation, network traffic flow would be restricted. Such restrictions can be undesirable and in some instances, a user may not even be able to complete a download due to the nature of the download and the traffic restrictions in place. In accordance with one embodiment, port restrictions can be lifted for downloading and re-enabled once a download is complete. For example, the trusted application may lift rate limits in response to a user download request. In another embodiment, files and other resources for download can be placed in a partition and/or be accessible through a port that does not have the restrictions in place.

In one embodiment, a single slave blade is used for a single client application and multiple client applications do not run on the same slave blade. In this embodiment, the rate limiting system described herein may be enabled entirely through hardware. In another embodiment, a developer may wish to have multiple client applications on the same blade. Hardware virtualization may be used to extend the system to allow for multiple applications. In other words, software may be used to enable rate limiting of multiple applications through the same port(s).

Figure 3:
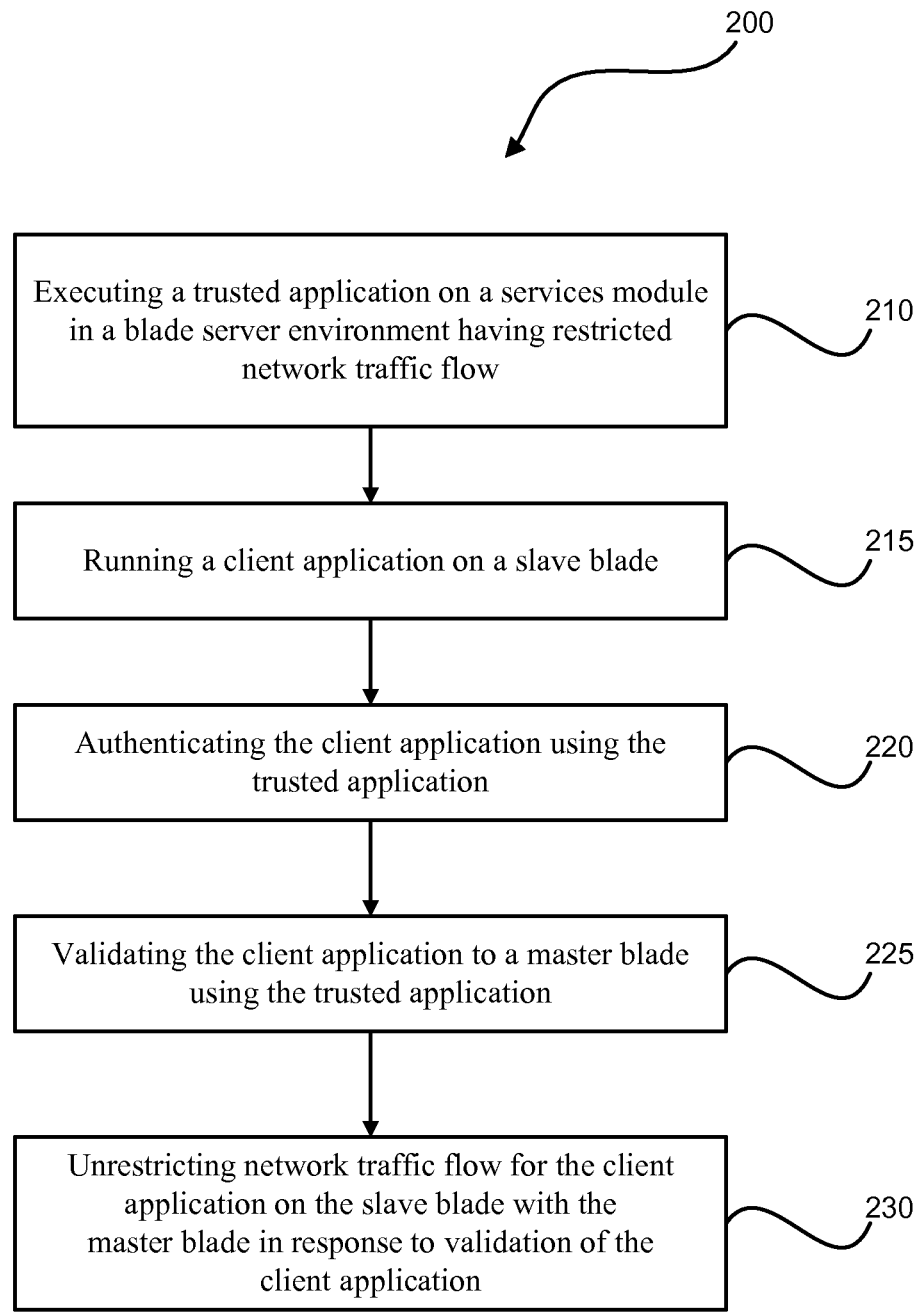
FIG. 3 is a flow chart of a method for rate limiting network traffic in accordance with an embodiment.

As shown in FIG. 3, a method 200 is provided for internal application authentication. In one operation 210, a trusted application is executed on a services module in a blade server environment having restricted network traffic flow. In another operation 215, a client application is run on a client blade in the blade server environment. In a further operation 220, the client application is authenticated on the trusted application. In another operation 225, the client application can be validated to a master blade using the trusted application. In a later operation 230, network traffic flow can be unrestricted, using the master blade, in response to validation of the client application.

The method may further comprise unrestricting network traffic flow to allow a user to download an application. The method may also comprise unrestricting network traffic flow when the client application uses a license. Validating the client application to the master blade using the trusted application may further comprise sending a command from the trusted application to the master blade using a proprietary network protocol. The method may also comprise reconfiguring hardware in the blade server environment using the master blade to change network traffic flow restrictions.

The system and method described herein provide valuable results as compared to schemes found in the prior art. Direct access to a backplane can be permitted without compromising system security. The system and method can allow for direct control over an application programming interface (API) for a switch. Hardware signals used as described herein and used for system security do not exist for a traditional server on top of a chassis. Where the nature of the server environment is an open platform, the system and method can instill limitations and protections so the system is a secure, controlled environment.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for rate limiting network traffic flow of an untrusted application, comprising:
    a master module in a server environment to manage network traffic flow restrictions for a client application on a slave module,
    wherein the master module comprises a processor and a memory on which is stored instructions to cause the processor to set the network traffic flow restrictions on the slave module when the master module has not received from a trusted application a validation of the client application on the slave module, to receive a validation of the client application from the trusted application to unrestrict the network traffic flow restrictions for the client application on the slave module, and to disable network traffic flow restrictions to allow a user to download the client application.

2. The system in accordance with claim 1, wherein the slave module and master module are each server blades.

3. The system in accordance with claim 1, further comprising a direct access module in the server environment to allow unrestricted traffic flow for client applications with a license.

4. The system in accordance with claim 3, wherein the license is a Software Development Kit (SDK) license.

5. The system in accordance with claim 3, wherein the license is on the slave module and the direct access module is on a services module and wherein the services module comprises flash memory for validating the license.

6. The system in accordance with claim 1, wherein the instructions are further to cause the processor to execute the trusted application in the master module.

7. The system in accordance with claim 6, wherein the instructions to cause the processor to execute the trusted application in the master module comprise a subsystem with an operating system.

8. The system in accordance with claim 1, wherein the system comprises a network switch.

9. The system in accordance with claim 1, wherein each of the master module and the slave module further comprises communication ports, and wherein the master module manages network traffic flow restrictions by managing slave module port rate limits.

10. The system in accordance with claim 1, wherein the trusted application is to cause the master module to enable and disable network traffic flow restrictions dynamically.

11. The system in accordance with claim 10, further comprising a proprietary network protocol to be used by the trusted application to cause the master module to enable and disable network traffic flow restrictions for the slave module.

12. The system in accordance with claim 1, wherein the master module and slave module communicate via a backplane.

13. The system in accordance with claim 1, wherein network traffic flow of an untrusted application is rate limited entirely by hardware.

14. A master blade for rate limiting network traffic flow of untrusted applications, comprising:
   a processor; and
   a memory on which is stored machine readable instructions that cause the processor to:
      manage network traffic flow restrictions for a client application on a slave blade, and
      set the network traffic flow restrictions for the client application on the slave blade when the master blade has not received from a trusted application a validation for the client application on the slave blade,
      receive from the trusted application a validation of the client application to unrestrict the network traffic flow restrictions for the client application on the slave blade, and
      disable network traffic flow restrictions to allow a user to download the client application.

15. A method comprising:
   executing a trusted application in a blade server environment having restricted network traffic flow;
   validating a client application running on a slave blade using the trusted application;
   receiving, at a master blade, a validation of the client application from the trusted application;
   unrestricting, by the master blade, the restricted network traffic flow for the client application on the slave blade in response to receiving the validation of the client application; and
   disabling, by the master blade, network traffic flow restrictions to allow a user to download the client application.

16. The method in accordance with claim 15, further comprising unrestricting the network traffic flow for the client application on the slave blade when the client application uses a license.

17. The method in accordance with claim 15, further comprising: sending the validation of the client application from the trusted application to the master blade using a proprietary network protocol.

18. The method in accordance with claim 17, further comprising reconfiguring hardware on the slave blade using the master blade to change the network traffic flow restrictions.

* * * * *